United States Patent
Papakonstantopoulos et al.

(10) Patent No.: US 9,085,676 B2
(45) Date of Patent: Jul. 21, 2015

(54) RUBBER COMPOSITION HAVING A CROSSLINK DISTRIBUTION, ITS PREPARATION AND ARTICLE WITH COMPONENT

(75) Inventors: George Jim Papakonstantopoulos, Medina, OH (US); Frank James Feher, Copley, OH (US); Christin Louise Alwardt, Akron, OH (US); Byoung Jo Lee, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 217 days.

(21) Appl. No.: 13/536,266

(22) Filed: Jun. 28, 2012

(65) Prior Publication Data

US 2014/0005297 A1 Jan. 2, 2014

(51) Int. Cl.
C08C 19/00 (2006.01)
C08L 9/06 (2006.01)
C08C 19/25 (2006.01)

(52) U.S. Cl.
CPC . *C08L 9/06* (2013.01); *C08C 19/00* (2013.01); *C08C 19/25* (2013.01)

(58) Field of Classification Search
None
See application file for complete search history.

(56) References Cited

U.S. PATENT DOCUMENTS

| | | | | |
|---|---|---|---|---|
| 3,781,250 | A * | 12/1973 | Wolpers | 525/346 |
| 6,852,794 | B2 * | 2/2005 | Puhala et al. | 524/588 |
| 6,936,669 | B2 | 8/2005 | Halasa et al. | 526/260 |
| 2008/0149248 | A1 * | 6/2008 | Zanzig et al. | 152/525 |
| 2009/0171014 | A1 * | 7/2009 | Hergenrother et al. | 524/588 |
| 2011/0237729 | A1 * | 9/2011 | Chen et al. | 524/388 |

* cited by examiner

*Primary Examiner* — Robert C Boyle
(74) *Attorney, Agent, or Firm* — Henry C. Young, Jr.

(57) ABSTRACT

The invention relates to a rubber composition and its preparation having a crosslink distribution, particularly at least two types of crosslinks, its preparation, and an article of manufacture, including a tire, having a component of such rubber composition. In one embodiment, such crosslink distribution relates to an inclusion in the rubber composition of an additive to promote the crosslink distribution where the additive itself has a part of the desired crosslink characteristics. The crosslink distribution can be random or in the nature of a gradient change between domains of different crosslinks.

10 Claims, No Drawings

RUBBER COMPOSITION HAVING A CROSSLINK DISTRIBUTION, ITS PREPARATION AND ARTICLE WITH COMPONENT

FIELD OF THE INVENTION

The invention relates to a rubber composition and its preparation having a crosslink distribution, particularly at least two types of crosslinks, its preparation, and an article of manufacture, including a tire, having a component of such rubber composition. In one embodiment the crosslink distribution can be a controlled crosslink distribution of at least two types of crosslinks. In one embodiment, such crosslink distribution relates to an inclusion in the rubber composition of an additive to promote the crosslink distribution where the additive itself has a part of the desired crosslink characteristics. The distributed crosslinks can be of different types including different length, different chemistry, and connecting different points on the crosslinked rubber chains. The distributed crosslinks can be present in different concentrations in the rubber composition. The crosslink distribution can be random or in the nature of a gradient change between domains of different crosslinks. The properties of the rubber composition can be varied by adjustment of such distributed crosslinks to promote various physical properties such as, for example, its viscoelastic properties, tear strength, abrasion resistance and green strength.

BACKGROUND OF THE INVENTION

Polymer compositions, particularly diene-based elastomer compositions, may be cured or vulcanized, with sulfur or other means to form what might be referred to as a crosslinked network. Vulcanization is a chemical process for converting the polymer chains of the elastomer into more durable compositions by chemical reaction of curatives such as sulfur which modify the polymer by forming crosslinks (bridges) between individual polymer chains. Vehicular tires usually contain components comprised of sulfur cured rubber compositions.

While the mechanism of sulfur crosslinking of diene-based elastomers to form a crosslinked rubber composition may not be fully understood, both the density of the crosslinks, or crosslink density, as well as the type of crosslinks of the rubber composition, are understood to have an effect on one or more of a rubber composition's physical properties. For example, the crosslink density of the rubber composition may be varied by changing the content of vulcanization agents such as sulfur which thereby promotes variations in the crosslinked polymer's physical properties. For example, as a general rule of thumb a relatively high crosslink density for the rubber composition promotes a more elastic material.

Physical properties affected by the density and the types of crosslinks may include but are not limited to, for example, one or more of stiffness, fatigue, tear strength and hysteresis of the rubber composition. For example, see the discussion by Lake and Thomas, *Proc. of the Royal Society of London*, Series A, Math. and Phys. Sciences, Vol. 300, No. 1460, Page 108, (1967) as well as Lawandy and Halim, *Journal of Applied Polymer Science*, Vol. 96, Pages 2440 through 2445 (2005). Further, the types of crosslinks can affect physical properties of a rubber composition as discussed by M. Klüppel, G. Heinrich, *Macromolecules* 27, Page 3596 (1994).

However, while some understanding exists relating to how the crosslink characteristics affect various physical properties of a rubber composition, a concept of providing two or more domains of different crosslink characteristics in a rubber composition is to be evaluated.

This invention was first conceived by contemplating the physics of elastomer blends. For example, a combination of two or more different types of elastomers as blends of elastomers to obtain rubber compositions with improved properties is a common procedure. In some instances, blending two different kinds of elastomers can result in phase separation of the individual elastomers, depending somewhat upon their miscibility (or immiscibility) with each other.

Various relationships between the chemistry of elastomer blends, morphologies of elastomer blends, individual elastomeric properties of an elastomer blend and polymer blend/copolymer based blends of elastomers have been evaluated.

However, for a purpose of combining different elastomers to obtain a rubber composition with improved physical properties, an evaluation of providing varying crosslink characteristics of a rubber composition of different elastomers is to be undertaken. In particular, instead of simply providing a blend of different elastomers to provide rubber compositions of varying physical properties, an evaluation is to be undertaken for providing a blend of similar or different elastomers of varying miscibility with a combination of different crosslink characteristics, therefore a plurality of types of crosslinks. Such evaluation can be undertaken by application of, for example, an additive that already exhibits an ability to provide a variety of crosslink characteristics for elastomers.

For this invention, an evaluation of controlled crosslink distributions (CCDs) of varied crosslink densities and/or crosslink types within an elastomer composition with the ability to be crosslinked and particularly sulfur curable rubber compositions, particularly rubber compositions containing diene-based elastomer(s), by use of a combination of sulfur-containing materials and free sulfur to cure, or crosslink, the rubber composition is to be undertaken. By crosslink type, crosslinks of different crosslink length, chemistry, and connecting different binding points on the crosslinked polymer chains are to be considered.

For such evaluation, it is contemplated that a distribution of crosslink densities and/or types within a sulfur curable elastomer-containing rubber composition could be prepared with crosslinks formed by a crosslink promoting additive CPA(1) together with crosslinks formed by a sulfur curative, alternately by an organoperoxide curative, to thereby promote formation of a distributed crosslink density and type within the sulfur curable elastomer-containing rubber composition.

Also, for such evaluation, it is further contemplated that a distribution of crosslink densities and/or types within a sulfur curable elastomer-containing rubber composition could be prepared with crosslinks formed by a crosslink promoting additive CPA(2) for combining with another ingredient (e.g. elastomer substituent) in the rubber composition to form a crosslink composite between elastomer chains, together with crosslinks formed by a sulfur curative, alternately by an organoperoxide curative, to thereby promote formation of a distributed crosslink density and type within the sulfur curable elastomer-containing rubber composition.

Representative of such ingredients (which may include substituents on an elastomer), for combining with said CPA (2) are, for example:

(A) functional groups contained on the elastomer such as example, amine, siloxy, hydroxyl and carboxyl groups and (B) coupling agents having a moiety reactive with the CPA(2) and another moiety interactive with diene-based elastomers such as, for example, coupling agent comprised of:

(1) bis (3-trialkylsilylalkyl)polysulfide having an average of from about 2 to about 4 connecting sulfur atoms in its polysulfidic bridge, and (2) alkoxyorganomercaptosilane.

Representative of such bis (3-trialkoxysilylalkyl)polysulfide is comprised of, for example, bis(3-triethoxysilylpropyl)polysulfide.

For illustrative purposes to depict an idealized complex crosslinked network of a plurality of differentiated crosslinks, exemplary of such CPA(2) promoted crosslinking (crosslinked elastomer) through interaction with (combining with) participating ingredients is illustrated by an idealized formula (A) in which the (—X-CPA(2)-X—) illustrates a formative plurality of crosslinks between elastomer chains and the ($S_y$) illustrates formative sulfur (polysulfur, for example) crosslinks between elastomer chains:

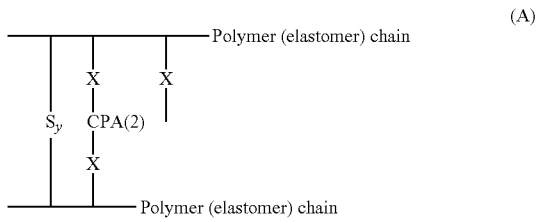
(A)

where $S_y$ represents at least one and alternately (more usually) an average of from 2 to 8 connecting sulfur atoms, with y therefore representing a value of 1 to at least 4 and alternately (more usually) an average of from 2 to and including 4, and where X represents:

(1) at least one functional group contained on the elastomer such as, for example, amine, siloxy, hydroxyl and carboxyl groups, or (2) coupling agents having a moiety reactive with the CPA (2) and another moiety interactive with diene-based elastomers such as, for example, coupling agent comprised of:

(a) bis (3-trialkylsilylalkyl)polysulfide having an average of from about 2 to about 4 connecting sulfur atoms in its polylsulfidic bridge, and (b) alkoxyorganomercaptosilane.

For further illustrative purposes to depict an idealized complex crosslinked network of a plurality of differentiated crosslinks, exemplary of such CPA(1) promoted crosslinking (forming a crosslinked elastomer) through interaction with (combining with) elastomer chains is illustrated by an idealized formula (B) in which the (-CPA(1)-) illustrates a formative plurality of crosslinks between elastomer chains and the ($S_y$) illustrates formative sulfur (polysulfur, for example) crosslinks between elastomer chains:

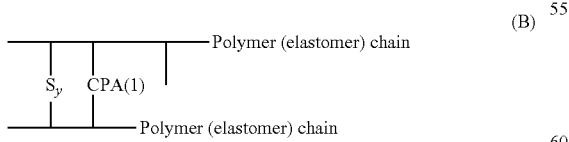
(B)

where $S_y$ represents at least one and alternately (more usually) an average of from 2 to 4 connecting sulfur atoms, with y therefore representing a value of 1 to at least 4 and alternately (more usually) an average of from 2 to and including 4.

It is contemplated that such CPA additive, namely said CPA(1) and CPA(2), could be added to (mixed with) the sulfur curable rubber composition during its preliminary, or non-productive, mixing in the absence of free sulfur curative, to at least partially crosslink the rubber composition following which in a separate and subsequent mixing step (productive mixing step) free sulfur curative is added (mixed). In such manner, then, the rubber composition would contain a distributed crosslink network comprised of a first crosslinked network created by the CPA additive and a second crosslink network created by the free sulfur curative.

In the description of this invention, the terms "rubber", "elastomer" and "rubbery polymer" may be used interchangeably unless otherwise indicated. The terms "cured", "crosslinked" and "vulcanized" may be used interchangeably unless otherwise indicated.

The term "phr" refers to parts by weight of a non rubber ingredient per 100 parts by weight of rubber in a rubber composition.

Such terms are known to those having skill in such art.

SUMMARY AND PRACTICE OF THE INVENTION

In accordance with this invention, a method of providing a rubber composition with a crosslink distribution (e.g. combination of at least two types of crosslinks) is comprised of:

(A) blending a rubber composition in at least one sequential preliminary mixing step (preferably in an internal rubber mixer) in the absence of free sulfur rubber curative (to a temperature in a range of for example about 130° C. to about 180° C.) which is comprised of:

(1) at least one diene-based (e.g. sulfur curable, or crosslinkable) elastomer, (2) rubber reinforcing fillers comprised of:

(a) amorphous synthetic silica (e.g. precipitated silica), (b) rubber reinforcing carbon black, or (c) combination of amorphous synthetic silica (e.g. precipitated silica) and rubber reinforcing carbon black, wherein said fillers may optionally additionally contain alumina ($Al_2O_3$);

(3) optionally a silica coupling agent for said silica (when said silica is used) having a moiety reactive with hydroxyl groups (e.g. silanol groups) on said silica and another, different, moiety interactive with said diene-based elastomer(s), (B) subsequently mixing said rubber composition in a final and separate productive mixing step (preferably in an internal rubber mixer) with a curative comprised of:

(1) sulfur (e.g. free sulfur or sulfur donor, preferably free sulfur, and usually at least one sulfur vulcanization accelerator, at an elevated temperature of, for example in a range of from about 80° C. to about 120° C.), or (2) organoperoxide, or (3) combination of said sulfur and organoperoxide; followed by:

(C) molding, and curing said rubber composition (e.g. to an elevated temperature in a range of, for example, about 120° C. to about 200° C.);

wherein a crosslink promotion additive (CPA) comprised of at least one of CPA(1) and (CPA(2) is added:

(1) in at least one of said preliminary mixing steps, or, (2) in said final productive mixing step, or (3) in a combination of at least one of said preliminary mixing steps and said final productive mixing step.

In further accordance with this invention, a rubber composition is provided by said method.

In additional accordance with this invention, an article of manufacture, for example a tire, is provided having a component comprised of a rubber composition prepared by said method.

In further accordance with this invention a rubber composition containing a combination of at least two types of crosslinks is provided comprised of:
(A) at least one diene-based (e.g. sulfur curable) elastomer, and rubber reinforcing fillers comprised of:
  (1) precipitated silica,
  (2) rubber reinforcing carbon black, or
  (3) combination of precipitated silica and rubber reinforcing carbon black,
(B) a crosslink network of distributed crosslinks between chains of said elastomer(s) comprised a combination of:
  (1) crosslinks derived from a CPA additive, and
  (2) crosslinks of at curative comprised of least one of sulfur and organoperoxide,
wherein said CPA additive is comprised of at least one of CPA(1) and CPA(2), In further accordance with this invention, an article of manufacture is provided having a component comprised of such rubber composition.

In additional accordance with this invention, said articles of manufacture is comprised of, for example, tires and engineered products comprised of, for example, transmission belts, conveyor belts and hoses.

In further accordance with this invention, said tire component is comprised of a tire tread.

In additional accordance with this invention, for said CPA crosslink promotion additive:
(A) CPA(1) is represented by a formula (I):

(B) CPA(2) is represented by a formula (II):

wherein
(1) C is the Core of the CPA additive,
(2) F is a functional group reactive with said diene-based elastomer(s),
(3) G is a functional group reactive with an ingredient in the rubber composition capable of reacting with said diene-based elastomer(s),
(4) B is an optional bridge element between C and F or between C and G;
(5) (a) represents the number of said optional bridge elements in CPA(1) having a value of at least 1, alternately a value of up to about 40, alternately in a range of from about 2 to about 40, and further alternately in a range of from about 2 to about 4, when said bridge element is present, and
(6) (b) represents the number of said optional bridge elements in CPA(2) having a value of at least 1, alternately a value of up to about 40, alternately in a range of from about 2 to about 40, and further alternately in a range of from about 2 to about 4, when said bridge element is present.

In one embodiment, for CPA(1) and CPA(2):
(A) C is selected from aliphatic hydrocarbon groups containing from 1 to about 100, alternately from 1 to about 10, carbon atoms, from aromatic hydrocarbon groups containing from about 5 to about 20, alternately from about 5 to about 10, carbon atoms; and from POSS cage groups comprised of oligomeric silesquioxanes;
(B) optional B is selected from at least one of aliphatic hydrocarbon groups containing from about 1 to about 20, alternately from about 1 to about 10, carbon atoms representative of which may be, for example, methylene, ethylene or propylene groups, aromatic hydrocarbons containing from 5 to about 10 carbon atoms representative of which may be, for example, phenyl or benzyl groups, epoxy groups and acrylic groups (e.g. methacrylic groups;
(C) F for said CPA(1) is comprised of at least one of amino groups, halogen groups, polysulfide groups containing an average of one to four sulfur atoms, epoxy groups, mercapto groups, acrylate groups (e.g. methacrylate groups), vinyl groups, thiocyanato groups, glycidoxyalkyl groups, and alkylacryloxy groups (e.g. methacryloxy groups), and
(D) G for said CPA(2) is comprised of at least one of hydroxyl groups, amino groups (e.g. primary and secondary amine groups, halogen groups (e.g. chlorine groups), epoxy groups, acrylate groups (e.g. methacrylate groups), vinyl groups, and vinyl benzyl-amino groups.

As indicated, and in an alternate embodiment, at least a portion (or all) of said CPA crosslink promoting additive, namely CPA(1) or CPA(2), may be added to the rubber composition in said final productive mixing step together with said sulfur and/or organoperoxide curative.

It is readily envisioned that, if desired and appropriate, more than one type of bridge element (B) may be present in the CPA (e.g. B1, B2 and B3, etc), that more than one type of functional element (F) may be present in the CPA(1) (e.g. F1, F2 and F3, etc), and than more than one type of functional element (G) may be present in the CPA(2) (e.g. G1, G2 and G3, etc.).

In practice, representative of said diene-based elastomer(s) are, for example, are polymers of at least one of isoprene and butadiene and copolymers of styrene with at least one of isoprene and 1,3-butadiene.

Representative examples of CPA(1) are, for example, and non limiting:
(A) polyhedral oligomeric silesquioxanes (POSS's) comprised of, for example octa -[(3-mercaptopropyl)silsesquioxane represented by the formula $(3\text{-HS}\text{---}C_3H_6)_8(Si_8O_{12})$, (where, for illustrative purposes, the "C" component of the CPA(1) is represented by the "$Si_8O_{12}$" moiety, the "B" component is represented by the "$C_3H_6$ moiety and the "F" component is represented by the "SH" moiety), mercaptopropylisobutyl silsesquioxane represented by the formula $C_{31}H_{70}O_{12}SSi_8$, glycidyl POSS represented by the formula $(C_6H_{11}O_2)_n(SiO_{1.5})_n$ where n is 8, 10 or 12, and octavinyl POSS represented by the formula $C_{16}H_{24}O_{12}Si_8$.

(B) organomercapto compounds comprised of, for example, pentaerythritol tetrakis(3-mercaptopropionate), trimethylolpropane tris(3-mercaptopropionate), 1,3-propanedithiol and 1,9-nonanedithiol, (where, for illustrative purposes, the "C" component of the CPA(1) is represented by the "nonane" moiety, a "B" component is non-existent) and the "F" component is represented by "thiol" moiety, and (C) self condensation product of a bis (3-trialkoxysilylalkyl)polysulfide, said polysulfide having an average from 2 to about 4 connecting sulfur atoms in its polysulfidic bridge (prior to said self condensation), (e.g. self condensation product of a bis (3-triethoxysilylpropyl)polysulfide), (where the "C" component of the CPA(1), namely the condensation product, is represented by a resultant "—Si—$(0)_3$—Si—" moiety, the "B" component is represented by the "alkyl" moiety and the "F" component is represented by the resultant "broken apart sulfur" moieties created by high shear mixing of the polysulfide with the rubber composition at an elevated temperature).

Representative examples of CPA(2) are, for example, and non limiting:

(A) polyhedral oligomeric silsesquioxanes (POSS's) comprised of, for example at least one of octa acrylo silsesquioxane $(C_6H_9O_2)_n(SiO_{1.5})_n$, where n=8,10 or 12, octa glycidyl silsesquioxane $(C_6H_{11}O_2)_n(SiO_{1.5})_n$, where n=8,10 or 12, octa vinyl silsesquioxane $C_{16}H_{24}O_{12}Si_8$, or octa hydroxyl silsesquioxane $Si_8O_{20}H_8$, and, (B). compounds comprised of, for example, butane-1,4-diol, (where, for illustrative purposes, the "C" component of the CPA(2) is represented by the "butane" moiety, the "B" component is non-existent, and the "F" component is represented by the "diol" moiety), hexane-1,4-diol, 1,2,4-butanetriol, or 1,2,4-benzenetriol.

Various organoperoxide curatives may be used, as may be appropriate. Representative of various organoperoxides for such purpose include, for example, and not intended to be limiting, dicumyl peroxide; di-t-butylperoxide; benzyl peroxide; 2,5-bis(t-butyl peroxy)-2,5-dimethyl hexane; 1,1-di-t-butyl peroxi-3,3,5-trimethyl cyclohexane; 2,5-dimethyl-2,5-dimetyl-2,5-di(t-butyl peroxy)hexyne-3; p-chlorobenzyl peroxide; 4,4-di-(tert-butylperoxy) valerate,2,4-dichlorobenzyl peroxide; 2,2-bis(t-butyl peroxi)-butane; 2,5-bis(t-butyl peroxy)-2,5-dimethyl hexane; and 2,5-dimethyl-2,5-di(t-butyl peroxy)hexane.

In practice, usually, a desirable organoperoxide curative is comprised of the dicumyl peroxide, although an alternate organoperoxide might be used alternative to, or instead of, the dicumyl peroxide, if appropriate, having a different curative activity (e.g. different free radical generation activity at a different temperature) is desired such as, for example, 4,4-di-(tert-butylperoxy) valerate.

Representative of said polyhedral oligomeric silsesquioxanes (POSS) is for example, said octa-[(3-mercaptopropyl) silsesquioxane.

Reference to polyhedral oligomeric silsesquioxanes (POSS) materials, in general, may be found, for example, in said U.S. Pat. No. 6,852,794 and a POSS catalog, or brochure, by Hybrid Plastics.

In one embodiment, said aforesaid silica coupling agent may be comprised of, example, at least one of bis(3-alkoxysilylalkyl)polysulfide having an average of from about 2 to about 4 connecting sulfur atoms in its polysulfidic bridge and an organoalkoxymercapto silane.

In one embodiment, said bis(3-trialkoxysilylalkyl)polysulfide may be comprised of bis(3-triethoxysilylpropyl)polysulfide containing an average of from about 2 to about 2.6 or from about 3.2 to about 3.8, connecting sulfur atoms in its polysulfidic bridge.

Representative of said organoalkoxymercaptosilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane and tripropoxy mercaptopropyl silane.

A significant aspect of the invention is the introduction in the rubber composition, and therefore an inclusion in the rubber composition, of a network of distributed crosslink density and/or types of crosslinks formed by at least one of said CPA(1) or CPA(2) together with said sulfur. Such distributed crosslink network in the rubber composition is provided to promote various physical properties of the rubber composition intended to be beneficial to vehicular tire performance.

In practice, the rubber of said rubber composition is comprised of at least one elastomer selected from copolymers of at least one of isoprene and 1,3-butadiene and terpolymers of styrene with at least one of isoprene and 1,3-butadiene.

Representative examples of such elastomers are, for example, cis 1,4-polyisoprene rubber (IR), (natural and synthetic), cis 1,4-polybutadiene rubber (BR), styrene-butadiene rubber (SBR), styrene-isoprene-butadiene terpolymer rubber (SIBR), styrene-isoprene rubber (SIR) and isoprene-butadiene rubber (IBR) and high vinyl polybutadiene rubber (HVPBD) having a vinyl 1,2-content in a range of from about 30 to about 80 percent.

In one embodiment, elastomers for this invention may be tin and/or silicon coupled, preferably tin coupled, as diene-based elastomers prepared by organic solvent polymerization in the presence of a suitable tin-based catalyst complex using at least one of isoprene and 1,3-butadiene monomers or of styrene together with at least one of isoprene and 1,3-butadiene monomers. Said tin and/or silicon coupled elastomers may be selected from, for example, styrene/butadiene copolymers, isoprene/butadiene copolymers, styrene/isoprene copolymers and styrene/isoprene/butadiene terpolymers. The preparation of tin and silicon coupled elastomers via organic solvent polymerization is well known to those having skill in such art.

In one aspect, the elastomers may include one or more in-chain or end functionalized diene-based elastomers. For example, such functionalized elastomer may be provided as a diene-based elastomer as described above which contains one or more functional groups comprised of at least one of hydroxyl groups, carboxyl groups, amine groups, siloxy groups, thiol groups and epoxy groups, particularly such groups which are available to participate in reactions with, for example, precipitated silica reinforcement.

Exemplary of functionalized elastomers, where appropriate, are such as for example, functionalized styrene/butadiene copolymer elastomers (functionalized SBR elastomers) containing amine and/or siloxy (e.g. alkoxyl silane as SiOR) functional groups.

Representative of such amine functionalized SBR elastomers is, for example, SLR4601™ from Styron and T5560™ from JSR, and in-chain amine functionalized SBR elastomers mentioned, for example, U.S. Pat. No. 6,936,669.

Representative of such siloxy functionalized SBR elastomers is, for example, SLR4610™ from Styron. Representative of such combination of amine and siloxy functionalized SBR elastomers is, for example, HPR350™ from JSR.

Other and additional elastomers are functionalized styrene/butadiene copolymer elastomers (functionalized SBR elastomers) containing hydroxy or epoxy functional groups.

Representative of such hydroxy functionalized SBR elastomers is, for example, Tufdene 3330™ from Asahi.

Representative of such epoxy functionalized SBR elastomers is, for example, Tufdene E50™ from Asahi.

In practice, it is therefore envisioned that said sulfur vulcanizable elastomer (diene-based elastomer) may be comprised of, for example, polymers of at least one of isoprene and 1,3-butadiene; copolymers of styrene and at least one of isoprene and 1,3-butadiene; high vinyl styrene/butadiene elastomers having a vinyl 1,2-content based upon its polybutadiene in a range of from about 30 to 90 percent and functionalized copolymers comprised of styrene and 1,3-butadiene ("functionalized SBR") selected from amine functionalized SBR, siloxy functionalized SBR, combination of amine and siloxy functionalized SBR, epoxy functionalized SBR and hydroxy functionalized SBR.

It should readily be understood by one having skill in the art that said rubber composition can be compounded by methods generally known in the rubber compounding art, such as mixing the various sulfur-vulcanizable constituent diene-based elastomers with various commonly-used additive materials such as, for example, curing aids, such as sulfur, activators, retarders and accelerators, processing additives, such as oils, resins including tackifying resins, plasticizers, fillers, pigments, zinc oxide, waxes, antioxidants and antiozonants, peptizing agents and the aforesaid reinforcing fillers as rubber reinforcing carbon black and synthetic amorphous precipitated silica aggregates. As known to those skilled in the art, depending on the intended use of the sulfur-vulcanizable and sulfur-vulcanized materials (rubbers), the various additives mentioned above are selected and commonly used in conventional amounts unless otherwise indicated herein.

The pneumatic tires are conventionally comprised of a generally toroidal-shaped carcass with an outer circumferential tread, adapted to be ground contacting, spaced beads and sidewalls extending radially from and connecting said tread to said beads.

Typical amounts of antioxidants may comprise, for example, 1 to about 5 phr. Representative antioxidants may be, for example, diphenyl-p-phenylenediamine and others, such as those disclosed in *The Vanderbilt Rubber Handbook* (1978), Pages 344 through 346. Suitable antiozonant(s) and waxes, particularly microcrystalline waxes, where used, may, for example, be of the type shown in *The Vanderbilt Rubber Handbook* (1978), Pages 346 and 347. Typical amounts of antiozonants where used, may, for example, comprise 1 to about 5 phr. Typical amounts of zinc oxide may, for example, comprise from 2 to about 5 phr. Typical amounts of waxes, where used, may comprise, for example, from 1 to about 5 phr. Typical amounts of peptizers, where used, may, for example, comprise from 0.1 to about 1 phr. The presence and relative amounts of the above additives are not normally considered herein as a significant aspect of the present invention.

The vulcanization of the elastomer composition is conducted in the presence of the crosslinking agents. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. Such sulfur-vulcanizing agents may normally used are used, for example, in an amount ranging from about 0.5 to about 5 phr with a range of from 1.5 to 2.3 being often preferred.

Accelerators are used to control the time and/or temperature required for vulcanization by the sulfur vulcanization agents and to improve the properties of the vulcanizate. In one embodiment, a single accelerator system may be used, i.e., primary accelerator. Conventionally, a primary accelerator is used in amounts ranging from, for example, about 0.5 to about 3 phr. In another embodiment, combinations of two or more accelerators might be used, if desired and where appropriate, in which a primary accelerator is might be used in the larger amount of, for example, from 0.5 to 1.0 phr, and a secondary accelerator which might be used in smaller amounts, for example, from 0.05 to 50 phr, in order to activate the sulfur vulcanization process. Combinations of such accelerators have historically been sometimes known to produce a synergistic effect of the final properties of sulfur-cured rubbers and are sometimes somewhat better than those produced by use of either accelerator alone. In addition, delayed action accelerators may be used, where appropriate which are less affected by normal processing temperatures but might produce satisfactory cures at ordinary vulcanization temperatures. Representative examples of accelerators include, for example, various amines, disulfides, diphenyl guanidine, thioureas, thiazoles, thiurams, sulfenamides, dithiocarbamates and xanthates, particularly diphenyl guanidine. The primary accelerator might be, for example, a sulfenamide such as, for example, N-cyclohexyl-2-sulfenamide. If a second accelerator is used, the secondary accelerator might be selected from, for example, the diphenyl guanidine, a dithiocarbamate or a thiuram compound.

The tire can be built, shaped, molded and cured by various methods which will be readily apparent to those having skill in the art.

For example, such unvulcanized rubber composition can be, for example, a tread rubber composition (e.g. in a form of an extruded uncured rubber strip) which can be applied in the building of the green (unvulcanized) rubber tire in which the uncured, shaped tread is built onto the carcass following which the green tire is shaped and cured.

Alternately, for a tire retreading operation, an unvulcanized, or partially vulcanized, tread rubber strip can be applied to a cured tire carcass from which the previous tread has been buffed or abraded away and the tread cured thereon as a retread.

The practice of this invention is further illustrated by reference to the following examples which are intended to be representative rather than restrictive of the scope of the invention. Unless otherwise indicated, all parts and percentages are by weight.

EXAMPLE I

Rubber composition was prepared to evaluate the usage of a CPA, namely CPA(1), to promote a controlled distribution of crosslinks in a crosslinked elastomer composition.

For this evaluation, a basic rubber composition is provided as reported in Table 1. The parts and percentages are by weight unless otherwise indicated.

TABLE 1

|  | Parts (phr) |
|---|---|
| First Non-Productive Mixing Step (NP) - Mixed in internal rubber mixer to about 160° C. | |
| Styrene/butadiene rubber (SBR)[1] | 70 |
| Cis 1,4-polybutadiene rubber[2] | 30 |
| Composite of carbon black and Silica coupling agent[3] | 10.4 |
| Silica, rubber reinforcing[4] | 65 |
| Crosslink promoting additive, CPA(1)[5] | 0 and 0.9 |
| Processing Oils & Wax | 22 |
| Antioxidants[6] | 2.8 |
| Zinc oxide | 3.5 |
| Productive Mixing Step (PR) - Subsequently mixed in internal rubber mixer to about 110° C. | |
| Sulfur | 1.7 |
| Sulfur vulcanization accelerator(s)[8] | 3.9 |

[1]Functionalized Styrene/butadiene rubber (SBR), comprised of styrene/butadiene copolymer containing about 21 percent bound styrene as Sprintal™ SLR 4602 from Styron
[2]High cis 1,4-polybutadiene rubber as BUD1207™ from The Goodyear Tire & Rubber Company
[3]Composite of carbon black and silica coupler in a 50/50 weight ratio where said silica coupler is comprised of a bis(3-triethoxysilylpropyl) polysulfide having an average in a range of from about 3.4 to about 3.8 connecting sulfur atoms in its polysulfidic bridge as Si69™ from Evonic
[4]Zeosil Z1165 MP ™ precipitated silica from Rhodia
[5]Thiol functionalized octa-propylsilsesquioxane (3-HS-$C_3H_6$)$_8$($Si_8O_{12}$) from The Goodyear Tire & Rubber Company
[6]Phenylenediamine(s)
[7]Sulfenamide and diphenyl guanidine sulfur vulcanization accelerators Conjugated diene-based elastomer compositions were prepared based on the formulation of Table 1 and identified as rubber Samples A and B. Rubber Sample A is a Control rubber composition without crosslink promoting additive CPA(1) and rubber Sample B contained the crosslink promoting additive CPA(1).

Various physical properties are presented in Table 2 and reported in parts and percentages by weight (e.g. parts by weight per 100 parts by weight rubber, or phr) unless otherwise indicated.

TABLE 2

|  | Rubber Compositions ||
|  | A | B |
| --- | --- | --- |
| Crosslink promoting additive, CPA(1), phr | 0 | 0.9 |
| Physical Properties |  |  |
| Tensile strength at break (MPa) | 12.8 | 13.8 |
| Elongation at break (%) | 420 | 390 |
| Modulus, 300%, ring, (MPa) | 8.8 | 10.9 |
| Rebound (Zwick) |  |  |
| 23° C. | 42.8 | 47.6 |
| 100° C. | 57.7 | 62.7 |
| Abrasion rate (mg/km), Grosch[1] |  |  |
| High severity (70 N), 12° slip angle, disk speed = 20 km/hr, distance = 250 meters | 133 | 114 |

[1] The Grosch abrasion rate run on an LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). In practice, a high abrasion severity test may be run, for example, at a load of 70 Newtons, 12° slip angle, disk speed of 20 km/hr and distance of 250 meters.

It can be seen from Table 2 that, for Experimental rubber Sample B with addition of the CPA in the non-productive mixing stage (prior to the productive, sulfur addition, productive mixing state) resulted in an increase of the Rebound physical property of the rubber composition at 23° C. and 100° C. by at least 10 percent which is indicative of improvement in hysteresis of the rubber composition, an indicated reduction in internal heat generation during the working of the rubber composition and a predictive reduction of the rolling resistance of a tire with a tread of such rubber composition, as compared to the Control rubber Sample A.

It can also be seen from Table 2 that the Grosch rate of abrasion value for the rubber composition of Experimental rubber Sample B (with the addition of the CPA) decreased by more than 10% as compared to Control rubber Sample A which indicates an improvement in resistance to abrasion and an indicated reduction in treadwear for a tread of such rubber composition.

This is considered to be significant in a sense of improving two physical properties of the rubber composition and a predictive improvement in two performance properties for a tire with tread of such rubber composition.

Therefore, it is concluded that it has been discovered that such controlled distribution of crosslinks can be beneficial for the preparation of a distributed crosslinked sulfur curable rubber composition with significant prospective utility for tire component, for example, and not intended to be limited, to a tire tread.

While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of providing a rubber composition with a crosslink distribution is comprised of:

(A) blending a rubber composition in at least one sequential preliminary mixing step in the absence of free sulfur rubber curative which is comprised of:
  (1) elastomer(s) which consist of at least one diene-based elastomer consisting of at least one of cis 1,4-polyisoprene, cis 1,4-polybutadiene, styrene-butadiene and styrene-isoprene-butadiene rubber,
  (2) rubber reinforcing fillers consisting of:
    (a) rubber reinforcing carbon black, or
    (b) combination of precipitated silica and rubber reinforcing carbon black, together with a silica coupling agent for said precipitated silica having a moiety reactive with hydroxyl groups on said precipitated silica and another, different, moiety interactive with said diene-based elastomer(s) comprised of a bis(3-triethoxysilylpropyl) polysulfide containing an average of from about 2 to about 2.6 or from about 3.2 to about 3.8 connecting sulfur atoms in its polysulfidic bridge or an organoalkoxymercaptosilane,
  wherein said rubber reinforcing fillers may optionally additionally contain alumina ($Al_2O_3$);
(B) subsequently mixing said rubber composition in a final and separate productive mixing step with a curative comprised of sulfur followed by:
(C) molding, and curing said rubber composition;
wherein a crosslink promotion additive (CPA), comprised of CPA(1), is added in at least one of said preliminary mixing steps wherein for said CPA crosslink promotion additive:
(D) CPA(1) is represented by a formula (I):

$$C(BF)_a \qquad (I)$$

wherein
  (1) C is the Core of the CPA additive represented as $C(BF)_a$,
  (2) F is a functional group reactive with said diene-based elastomer(s),
  (3) B is an optional bridge element between C and F;
  (4) and "a" represents the number of said bridge elements in CPA(1) having a value of
    (a) from 2 to 40 when C is a POSS group, and
    (b) at least one when C is an aliphatic or an aromatic hydrocarbon group,
  wherein C is selected from aliphatic hydrocarbon groups containing from 1 to about 100 carbon atoms, from aromatic hydrocarbon groups containing from about 5 to about 20 carbon atoms; and from POSS cage group comprised of oligomeric silesquioxanes,
  wherein optional B is selected from at least one of aliphatic hydrocarbon groups containing from about 1 to about 20 carbon atoms, and aromatic hydrocarbons containing from 5 to about 10 carbon atoms,
  wherein F is selected from polysulfido groups containing an average of one to four sulfur atoms and mercapto groups.

2. The method of claim 1 wherein C is a POSS cage group.

3. The method of claim 1 wherein, for said CPA (1), which is represented by formula (I) as $C(BF)_a$:
  (A) C, of $C(BF)_a$, is selected from aliphatic hydrocarbon groups containing from 1 to about 100 carbon atoms, and from aromatic hydrocarbon groups containing from about 5 to about 20 carbon atoms; and
  (B) B, of $C(BF)_a$, is selected from at least one of aliphatic hydrocarbon groups containing from about 1 to about 20 carbon atoms, and aromatic hydrocarbons containing from 5 to about 10 carbon atoms.

4. The method of claim 1 wherein C is selected from POSS cage groups comprised of oligomeric silesquioxanes.

5. The method of claim 1 wherein C is selected from aliphatic hydrocarbon groups containing from 1 to about 100 carbon atoms.

6. The method of claim 1 wherein C is selected from aromatic hydrocarbon groups containing from about 5 to about 20 carbon atoms.

7. The method of claim 3 wherein C is selected from POSS cage groups comprised of oligomeric silesquioxanes.

8. The method of claim 3 wherein C is selected from aliphatic hydrocarbon groups containing from 1 to about 100 carbon atoms.

9. The method of claim 3 wherein C is selected from aromatic hydrocarbon groups containing from about 5 to about 20 carbon atoms.

10. The method of claim 1 wherein up to 0.9 phr of the CPA(1) crosslink promotion additive is added.

\* \* \* \* \*